350-345
1/13/81   4,244,636

United States Patent [19]
Baur et al.

[11] 4,244,636
[45] Jan. 13, 1981

[54] DISPLAY DEVICE FOR THE REPRESENTATION OF BRIGHT IMAGES ON A DARK BACKGROUND AND A PROCESS FOR OPERATION OF THE DEVICE

[75] Inventors: Guenter Baur, Freiburg; Waldemar Greubel; Hans Krueger, both of Munich; Alois Schauer, Gruenwald, all of Fed. Rep. of Germany

[73] Assignee: Siemens Aktiengesellschaft, Berlin & Munich, Fed. Rep. of Germany

[21] Appl. No.: 877,486

[22] Filed: Feb. 13, 1978

[30] Foreign Application Priority Data
Feb. 15, 1977 [DE] Fed. Rep. of Germany ....... 2706372

[51] Int. Cl.$^3$ .............................................. G02F 1/133
[52] U.S. Cl. ...................................................... 350/345
[58] Field of Search ........................................ 350/345

[56] References Cited

U.S. PATENT DOCUMENTS

| | | | |
|---|---|---|---|
| 3,841,083 | 10/1974 | Bergey | 350/345 X |
| 4,104,627 | 8/1978 | Thuler | 350/345 X |
| 4,111,534 | 9/1978 | Cirkler et al. | 350/345 |
| 4,126,384 | 11/1978 | Goodman et al. | 350/345 |
| 4,142,781 | 3/1979 | Baur et al. | 350/345 |

FOREIGN PATENT DOCUMENTS

| | | |
|---|---|---|
| 2158563 | 6/1972 | Fed. Rep. of Germany . |
| 2554226 | 6/1977 | Fed. Rep. of Germany . |
| 2616669 | 10/1977 | Fed. Rep. of Germany . |
| 2619286 | 11/1977 | Fed. Rep. of Germany . |
| 2625864 | 12/1977 | Fed. Rep. of Germany . |
| 1372868 | 11/1974 | United Kingdom . |

*Primary Examiner*—Edward S. Bauer
*Attorney, Agent, or Firm*—Hill, Van Santen, Steadman, Chiara & Simpson

[57] ABSTRACT

A display device for representation of a bright image on a background which device has a light valve comprising a liquid crystal cell having a medium which can be switched zone-wise between at least two optical states and a light trap or body which consists of a material having an index of refraction greater than 1, contains a fluorescent material, and is provided with an outlet window for each of the switchable zones characterized by means coacting with the switchable medium to control the passage of the light through the device so that in a rest or inactive state of the medium, the medium and means allow the passage of the excitation light for the fluorescent particles and the passage of the fluorescent light therefrom and in an "on" or activated state of the medium, the means and medium are impermeable at least to the fluorescent light so that each of the switchable zones of the medium is placed in an "on" state only when it belongs to the background of the image. The means may be a pleochroic dye operating with a single polarizer or a pair of cross polarizers, which cooperate with the material of the liquid crystal which forms a twisted cell.

1 Claim, 1 Drawing Figure

U.S. Patent     Jan. 13, 1981     4,244,636
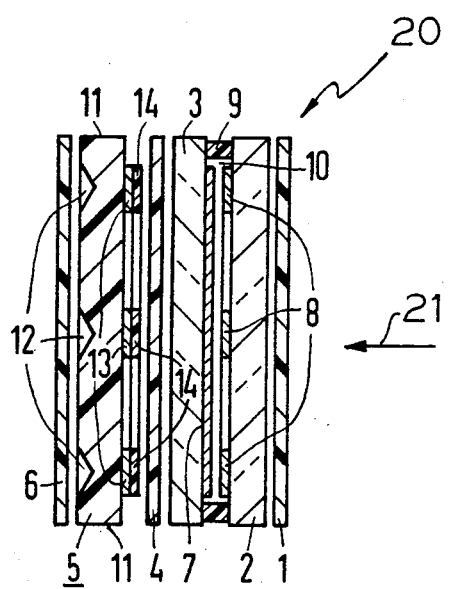

DISPLAY DEVICE FOR THE REPRESENTATION OF BRIGHT IMAGES ON A DARK BACKGROUND AND A PROCESS FOR OPERATION OF THE DEVICE

BACKGROUND OF THE INVENTION

The present invention is directed to a display device for representing bright images on a dark background. The display device comprises a light valve and in particular a liquid crystal cell which has a medium that can be switched zone-wise between at least two optical states, means for selectively switching the zones of the medium and a light trap body, which consists of a material having an index of refraction greater than 1, contains fluorescent particles and has a light outlet window assigned to each of the switchable zones of the medium to pass light therethrough.

A display in which a liquid crystal cell having a medium which is arranged with a light trap consisting of a plate containing fluorescent material and outlet windows is disclosed in the co-pending U.S. patent application Ser. No. 747,035, which issued as U.S. Pat. No. 4,142,781 and includes a disclosure of German patent applications P 25 54 226 and P 26 16 669. The devices disclosed in the above U.S. application have a high contrast in the representations of the cell due to the light trap or fluorescent body intercepting a large part of the surrounding light striking it by means of fluorescent scattering and total reflection and then emitting the light from the body at a relatively high intensity at special outlet or emergent windows. The brightness at the window is dependent on the ratio between the light collecting area to the light emitting surface area of the windows. Thus, the greater the ratio or brightness amplification factor, the brighter the image at the windows.

If the light valve allows passage of the excitation light for the fluorescent particles when the medium is in a rest condition or state, a particularly large collector surface can be achieved. For this purpose, it is contemplated to either develop polarizers, which are permeable to the excitation light (see U.S. Ser. No. 747,035) or cover only the switchable portions of the display element with the polarizer as proposed in U.S. patent application Ser. No. 791,406, which is now abandoned and includes the disclosure of German patent application P 26 19 286. In the case of a light valve using a liquid crystal, it has been proposed to orientate the liquid crystal layer outside the display elements in such a manner that the cell becomes transparent in those zones (see German application No. P 26 25 864).

SUMMARY OF THE INVENTION

The present invention is directed to providing a display device having a light valve, such as the liquid crystal cell, which light valve is open to the passage of light in a starting or rest state and to provide a further alternative which can be easily achieved.

To obtain these objects, the present invention is directed to an improvement in a display device for the representation of bright images on a dark background, said device including a light valve comprising a liquid crystal cell having a medium which can be switched zone-wise between at least two optical states and means for selectively switching the switchable zones of the medium between a rest state and an activated state; and a body which consists of a material having the index of refraction greater than 1, contains fluorescent particles, and has a light outlet window assigned to each of the switchable zones of the medium to pass light therethrough. The improvements comprise control means coacting with the switchable medium to control the passage of the light through the device so that while the medium is in a rest state, the medium and the means allow the passage of the excitation light for the fluorescent particles and the passage of the fluorescent light therefrom and when the medium is in an activated state, the control means and the medium become impermeable at least to the fluorescent light so that each of the switchable zones of the medium are placed in an activated state when the zone belongs to the background of the image.

The display in accordance with the present invention requires no extra structural outlay. In particular, it may be obtained by using normal polarizer foils and when a liquid crystal cell is employed as a light valve, it does not require a locally differing liquid crystal texture. It merely is necessary to ensure that the input information which is to be represented on the device is complementary connected to the switching elements or electrodes of the device.

Even though the light valve passes light beams while in the rest state, the image background still will appear to be virtually black to the observer. This is due to the fact that the part or area of the screen surface not occupied by the switchable zones is dark due to only a very small part of the light accumulating in the fluorescent body re-emerging outside of the areas of the outlet or exit windows and because light is captured by an absorption foil which is located at the rear of the fluorescent body. Furthermore, those switchable zones not required for the construction of the image assume a light blocking state.

If the proposed display device contains a liquid crystal cell, it is advisable to design the liquid crystal cell as a so-called twisted cell having cross polarizers. Since as is known in practice, cross polarizers weaken the light not only by polarization but also by unavoidable absorption, it is desirable to have the polarizers cover only the area of the switchable zones of the medium of the liquid crystal cell if possible. If the liquid crystal substance of the cell is treated with a pleochroic dye, it is possible to entirely dispense with one of the polarizers. For a detailed discussion of the use of pleochroic dyes, reference is made to our co-pending U.S. patent application Ser. No. 877,461 filed Feb. 13, 1978.

If the rear polarizer, when considered in the direction of observation or viewing is not present, the fluorescent body can be brought close to the switchable medium of the light valve to provide an additional brightness of the image, and a layer observation angle with a smaller parallax error. Since the proposed display device with the light trap does not produce any light by itself, and if the ambient light is inadequate, the display may be equipped with an artificial light source. If the additional illumination or light source is arranged laterally to the fluorescent body and/or is designed to be such that it fundamentally supplies only excitation light for the fluorescent particles, a brightness representation with an equally dark background may be obtained. It is particularly expedient to produce the light with the aid of a radioactive substance and particularly a weak $\beta$-emitter, such as for example tritium and a luminous material which can be excited by the emissions of the radioactive substance.

This type of additional illumination consumes no electric power, emits light without a need to depress a push button, and can be integrated in an already existing component such as a fluorescent body in a space saving fashion. A discussion in greater detail of such an arrangement is contained in our co-pending application U.S. Ser. No. 877,367 filed Feb. 13, 1978 and now abandoned.

BRIEF DESCRIPTION OF THE DRAWING

The FIGURE is a cross-sectional view of an exemplary embodiment of the display device in accordance with the present invention.

DESCRIPTION OF THE PREFERRED EMBODIMENT

The principles of the present invention are particularly useful when incorporated in a display device generally indicated at 20 which is observed from a direction indicated by arrow 21. The display device 20 comprises a light valve which is formed by a liquid crystal cell comprising a single digit display which is operated by a drive component which is not shown for purpose of clarification but comprises a conventional drive component for a liquid crystal display device.

When viewed in the direction of observation indicated by the arrow 21, the display 20 contains a front polarizer 1, a front carrier plate 2, a rear carrier plate 3, a rear linear polarizer 4, a plate-shaped fluorescent body or light trap 5 and an absorption foil 6. The inner surfaces of the two carrier plates 2 and 3 are each provided with transparent conductive coatings. The rear plate 3 has a transport continuous rear electrode 7 and the front plate 2 has a segmented front electrode 8. The two plates are spaced apart from one another by a spacing frame 9, which coacts with the two plates 2 and 3 to form a hermetically sealed chamber which is filled with a liquid crystal substance or layer 10. The liquid crystal cell operates in accordance with the principles of the so-called rotary or twisted cell. The liquid crystal molecules possess a dielectric constant having a positive anisotropy and in a rest state are homogeneously oriented with a 90° transposition in the direction of the plate normal and when subjected to the "on" or activated state by the application of a voltage to the selected electrodes will assume a homeotropic texture. A further discussion of the operation of the twisted cell is contained in the British patent specification No. 1,372,868 which corresponds to German Offenlegungsschrift No. 21 58 563. In the present application, the two linear polarizers 1 and 4 are cross polarizers with the direction of polarization extending at 90° to each other. Therefore, in the rest condition or state of the cell or zone, light polarized in one direction by the polarizer 4 will have the direction of polarization rotated by the liquid crystal layer 10 by 90° so that the polarized light can pass through the front polarizer 1. However, when a voltage is applied between the electrodes 7 and 8 or portions thereof, the orientation of the liquid crystal layers subjected to the voltage are changed to a homeotropic texture so that the light polarized by the polarizer 4 cannot pass through the front polarizer 1.

The fluorescent plate 5 is provided on each of its four edge surfaces or sides with a reflective layer 11 and is provided with an outlet or emergent window for each of the segments of the segment electrodes 8. Each of the windows consist of a positive reflecting groove 12 on a rear surface of the plate 5 and a light scattering pigment layer 13 on a front surface of the plate. If a luminous or fluorescent material, which can be excited, for example, by the output of a β-emitter, for example, tritium, is used for the pigment layer 13 and if this layer is coated with a thin film containing tritium such as the tritium lacquer layer 14, each of the non-operated display elements is able to provide a specific minimum brightness. A detailed description of an expedient structure for each of the windows is contained in our co-pending U.S. patent application Ser. No. 877,366 filed Feb. 13, 1978.

In operation of the device 20, drive components, which apply a voltage to the selected segments of the segment electrodes 8, are operated in such a manner that the segment electrodes, which are not required to construct the image being displayed and which are to be representative or remain as part of the background, are provided with the voltage to switch the layer interposed therebetween into an activated or blocking condition. The remaining segment electrodes, which are to form part of the image are not actuated. Thus an image, which may be luminescent in a fluorescent color, is formed on a dark background.

The invention is not limited to the illustrated embodiment. Thus, the principles of complementary drive can also be used in other light valves or liquid crystal cells. Furthermore, it should also be conceivable or providing an adverse operation in the light valve having switchable intermediate states, for example, a gray or a color scale. It is merely essential that the light valves should allow passage of light while in the rest state and at least absorb the emission frequencies of the fluorescent particles and possibly the light frequencies of the additional illumination while in an activated or "on" state. At the same time, by virtue of the selection of the suitable drive technique, the light valves can be switched between two states which differ in such a manner that the information will be represented with adequate contrast and sufficient brightness.

Although various minor modifications may be suggested by those versed in the art, it should be understood that we wish to embody within the scope of the patent warranted hereon, all such modifications as reasonably and properly come within the scope of our contribution to the art.

We claim:

1. A device for displaying bright characters against a dark background comprising a twisted nematic liquid crystal cell located between cross polarizers and having character shaped electrode segments for applying a voltage across the liquid crystal material, an illumination plate located behind said liquid crystal cell and being formed of a solid body having fluorescent particles dispersed therethrough, grooves being located in the region directly behind each electrode segment and being formed in the rear surface of said illumination plate for directing fluorescent illumination from said plate through the liquid crystal cell in the region of the character shaped electrode segments, an absorption foil being located behind said illumination plate, a luminous coating being provided on the front surface of said illumination plate and being restricted to the regions of the front surface of the illumination plate directly behind said character shaped segments, a tritium lacquer layer being on the surface on said luminous coating for emitting beta-radiation to excite the luminous coating material.

* * * * *